US011681280B2

(12) United States Patent
Nagpal et al.

(10) Patent No.: US 11,681,280 B2
(45) Date of Patent: Jun. 20, 2023

(54) MATERIAL PROCESSING OPTIMIZATION

(71) Applicant: Andritz Inc., Glens Falls, NY (US)

(72) Inventors: Neeraj Nagpal, Decatur, GA (US); Peter Antensteiner, Lewisburg, PA (US)

(73) Assignee: Andritz Inc., Alpharetta, GA (US)

( * ) Notice: Subject to any disclaimer, the term of this patent is extended or adjusted under 35 U.S.C. 154(b) by 262 days.

(21) Appl. No.: 16/710,243

(22) Filed: Dec. 11, 2019

(65) Prior Publication Data

US 2020/0209839 A1 Jul. 2, 2020

Related U.S. Application Data

(60) Provisional application No. 62/786,655, filed on Dec. 31, 2018.

(51) Int. Cl.
*G06F 19/00* (2018.01)
*G05B 19/418* (2006.01)

(52) U.S. Cl.
CPC ............. *G05B 19/41875* (2013.01); *G05B 2219/32201* (2013.01); *G05B 2219/32368* (2013.01)

(58) Field of Classification Search
CPC .... G05B 19/41875; G05B 2219/32201; G05B 2219/32368; G05B 2219/32187; G05B 2219/32188; G05B 2219/32194; G05B 13/048; Y02P 80/40; Y02P 90/02; G06Q 10/04; G06Q 10/06395
See application file for complete search history.

(56) References Cited

U.S. PATENT DOCUMENTS 6,301,515 B1 * 10/2001 Wagner ................ G05B 13/024
700/109
2010/0318934 A1 * 12/2010 Blevins ............ G05B 19/41875
700/110

(Continued)

OTHER PUBLICATIONS

Chu et al., "Model predictive control and optimization for papermaking processes", Advanced Model Predictive Control, Jul. 2011, pp. 309-342.

(Continued)

*Primary Examiner* — Zhipeng Wang
(74) *Attorney, Agent, or Firm* — Fish & Richardson P.C.

(57) ABSTRACT

Methods, systems, and apparatus, including computer programs encoded on a computer storage medium, for optimizing material processing. In one aspect, a method includes collecting, from a set of sensors, a set of current manufacturing conditions. Based on the set of current manufacturing conditions collected from the sensors, a set of current qualities of a material currently being processed by manufacturing equipment is determined. A baseline production measure for processing the material according to the set of current qualities is obtained. A candidate set of manufacturing conditions that provide an improved production measure relative to the baseline production measure is determined. A set of candidate qualities for the material produced under the candidate set of manufacturing conditions is determined. A visualization that presents both of the set of candidate qualities of the material and the set of current qualities of the material currently being processed is generated.

24 Claims, 8 Drawing Sheets

(56) References Cited

U.S. PATENT DOCUMENTS

| | | | |
|---|---|---|---|
| 2012/0083917 A1* | 4/2012 | Zhou | G05B 19/41875 |
| | | | 700/110 |
| 2013/0069792 A1* | 3/2013 | Blevins | G06F 17/16 |
| | | | 703/2 |
| 2018/0341248 A1* | 11/2018 | Mehr | G06N 3/08 |
| 2020/0201313 A1* | 6/2020 | Kludt | G06N 3/082 |

OTHER PUBLICATIONS

Extended European Search Report in EP Application No. 19216812.8-1205 dated May 7, 2020, 10 pages.

* cited by examiner

MATERIAL PROCESSING OPTIMIZATION

CROSS REFERENCE TO RELATED APPLICATION

This application claims priority to U.S. Provisional Application No. 62/786,655, filed on Dec. 31, 2018, the entire contents of which is hereby incorporated by reference.

BACKGROUND

This specification relates to optimizing processing of materials.

Industrial processing can include chemical, physical, electrical or mechanical steps to aid in the manufacturing of an item or items. The outputs of industrial processing vary based on conditions of the processing facility and the materials being processed.

SUMMARY

In general, one innovative aspect of the subject matter described in this specification can be embodied in methods that include the actions of collecting, from a set of sensors, a set of current manufacturing conditions; determining, based on the set of current manufacturing conditions collected from the sensors, a set of current qualities of a material currently being processed by manufacturing equipment; obtaining a baseline production measure for processing the material according to the set of current qualities; determining a candidate set of manufacturing conditions that provide an improved production measure relative to the baseline production measure; determining a set of candidate qualities for the material produced under the candidate set of manufacturing conditions; and generating a visualization that presents both of the set of candidate qualities of the material and the set of current qualities of the material currently being processed. Other embodiments of this aspect include corresponding systems, apparatus, and computer programs, configured to perform the actions of the methods, encoded on computer storage devices.

These and other embodiments can each optionally include one or more of the following features. Determining a candidate set of manufacturing conditions that provide an improved production measure relative to the baseline production measure can include determining a one or more of a wood source mixture or power consumption that provide a candidate improved production measure; and determining, based on a statistical model of materials previously produced with various combinations of manufacturing conditions, a corresponding set of qualities of materials processed with the one or more of the wood source mixture or the power consumption.

Determining a set of candidate qualities for the material produced under the candidate set of manufacturing conditions can include comparing the corresponding set of qualities to target qualities of completed materials; determining that the corresponding set of qualities meets the target qualities; and selecting the corresponding set of qualities as the candidate set of qualities based on the determination that the corresponding set of qualities meets the target qualities. Determining that the corresponding set of qualities meets the target qualities can include determining that one or more qualities among the corresponding set of qualities is within a custom quality value range specified by a user.

Generating a visualization that presents both of the set of candidate qualities of the material to the set of current qualities of the material currently being processed can include generating a first spider graph that visually represents a first plurality of values of a plurality of different material qualities; generating a second spider graph that visually represents a second plurality of values of the plurality of different material qualities; and incorporating both of the first spider graph and the second spider graph into a target quality template that depicts different zones including, for each target quality, at least a meets target quality zone and a doesn't meet target quality zone. The first spider graph can be color coded on a per-zone basis.

Methods can include the operations of generating a visualization of the baseline production measure, an actual production measure over a period of time, and a computed production measure over that period of time, wherein the computed production measure provides the production measure for production of materials under the candidate manufacturing conditions.

Methods can include the actions of changing a state of one or more paper pulp processing machines based on the candidate manufacturing conditions.

Particular embodiments of the subject matter described in this specification can be implemented so as to realize one or more of the following advantages. The quality (e.g., characteristics) of a material (e.g., pulp) can be determined while the pulp is being produced, thereby enabling real time evaluation of the material quality during manufacturing. As such, the quality of the material can be changed without first having to produce the material, test the material, and then produce another batch of material under new conditions. This reduces the time needed to arrive at materials having the desired quality (e.g., characteristics), reduces manufacturing time, and reduces waste. The systems and methods discussed herein can also output recommended (e.g., optimized) manufacturing conditions and/or change the manufacturing conditions to achieve materials of the desired quality. Simulations can be used for purposes of experimenting with different changes to the manufacturing conditions to obtain feedback as to quality of the materials produced if the manufacturing conditions were implemented. The quality of materials can be evaluated/determined at different points along the manufacturing process, rather than having to wait to test a final manufactured materials. Desired qualities of the manufactured materials can be input and/or changed, and optimized manufacturing conditions for producing materials having those desired qualities can be output or implemented by the system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
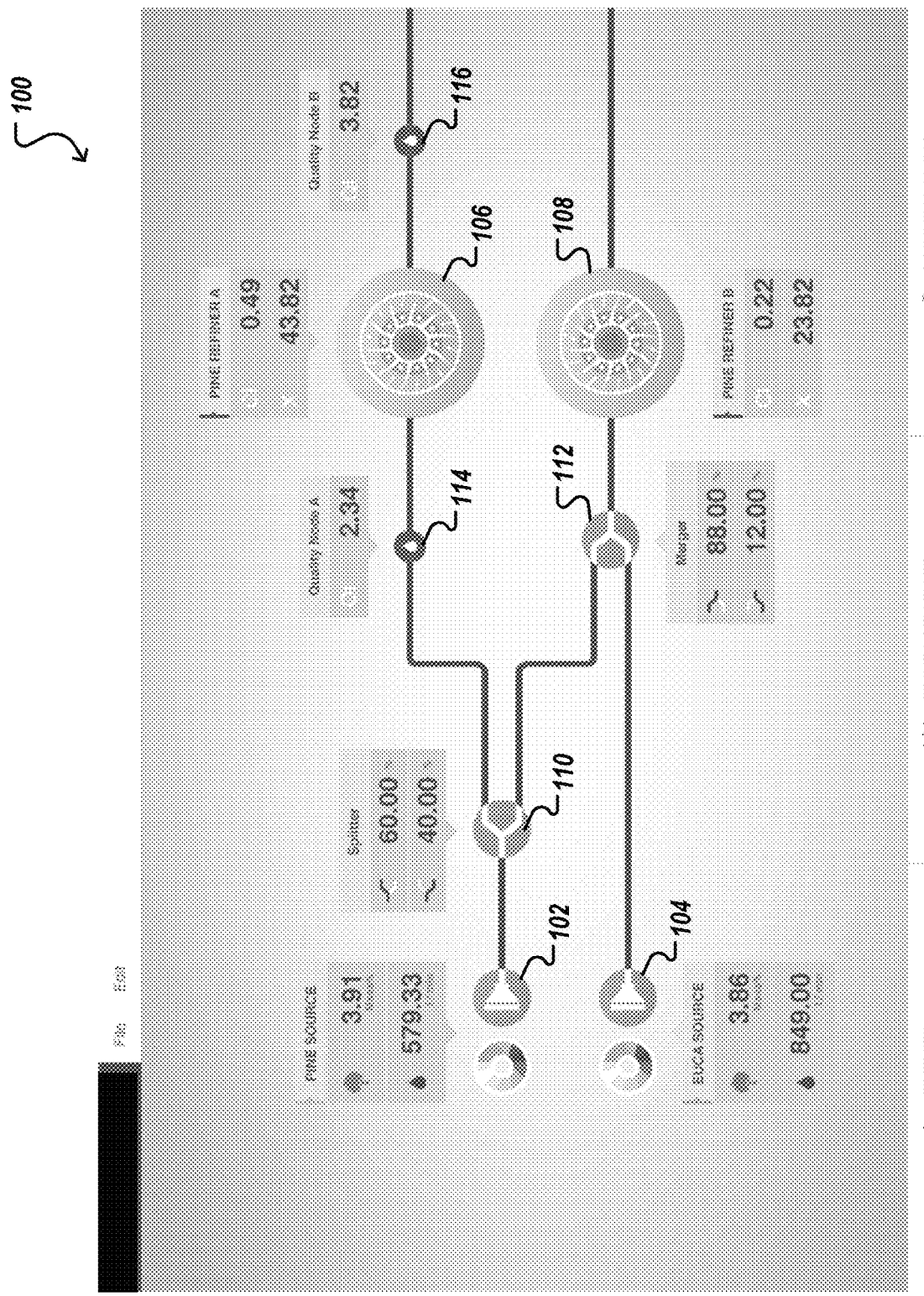
FIG. 1 is a user interface depicting a diagram of an example paper pulp processing system.

This document discusses techniques for optimizing the production of materials during production. In other words, the techniques discussed herein enable real time adjustments to the manufacturing conditions to be made, rather than having to wait until materials have been produced and tested, which can take hours or days. As such, the techniques discussed in this document reduce the amount of time required to arrive at materials having a set of desired qualities, as well as reducing the waste (e.g., material waste, energy waste, etc.) associated with traditional "manufacture, test, and adjust" techniques that require the completion and testing of materials before manufacturing conditions can be evaluated and/or modified. Thus, the present techniques improve the functioning of the equipment in the manufacturing plant by enabling the equipment to determine the quality of materials currently being produced and modify the manufacturing conditions so as to obtain more materials having more desirable qualities, also referred to as target qualities. For purposes of example, the techniques described in this document are discussed with reference to pulp manufacturing, but the techniques can also be applied to the processing of other materials.

As described in more detail throughout this document, the techniques described in this application generally collect information from sensors distributed throughout a manufacturing facility, and use that information to determine a set of qualities of material currently being processed by the manufacturing facility. For example, the sensors can include water quality sensors, flow sensors, temperature sensors, pressure sensors, and/or power sensors, among other sensors, which can each report various manufacturing conditions to a server, or other control system. As used throughout this document the phrase "manufacturing conditions" refers to one or more characteristics of a manufacturing/material processing environment, and can include environmental conditions, information about materials being processed or being used as part of the processing, and/or equipment status, among other conditions.

The set of current manufacturing conditions can be used to determine a set of current qualities of a material currently being processed by the manufacturing equipment. For example, in the context of paper pulp production, the set of current qualities can include one or more values for opacity, bulk density ("Bulk"), tensile energy absorption ("TEA"), burst strength ("Burst"), tensile strength ("Tensile"), tear strength ("Tear"), Canadian Standard Freeness ("CSF"), amount of long-fiber ("Longfiber"), and/or other appropriate qualities. The set of current qualities can be determined, for example, using a statistical model that takes the current manufacturing conditions as input and outputs a set of current qualities that are expected for the materials currently being produced under the current manufacturing conditions.

In some situations, the production of the material can be optimized, for example, to improve a production measure of the material processing. As used throughout this document, the phrase "production measure" refers to a measure of production requirements. Some examples of production requirements include a total cost of production, an amount of materials required for production, an amount of energy required for production, an amount of time required for production, or other requirements for producing the materials. Changing the production measures can result in changes to the qualities of the materials being produced. For example, in the context of paper pulp production, changing the amount of energy used to produce the pulp and/or changing the ratios of source wood materials will result in pulp having different characteristics, or qualities. However, the change to the qualities of the pulp (or other material being produced) produced may still meet specified target qualities, thereby providing an acceptable pulp, while improving the production measure.

As discussed in more detail below, user interface can be generated that presents a visualization (e.g., a graphical representation) of the set of current qualities for the material being produced and the different qualities that the material will have if produced under the different production measure(s). The visualization can include graphs (or other graphical representations) that allow for direct comparison of the set of current qualities and the corresponding qualities that will result from producing the material under the different production measure(s).

FIG. 1 is a user interface 100 depicting a diagram of an example paper pulp processing system. The system depicted in the user interface 100 includes a pine source 102 that provides pine wood material for processing and a eucalyptus source 104 that provides eucalyptus wood material for processing.

The system also includes refiner 106 ("Refiner A") and refiner 108 ("Refiner B"). Each of the refiners 106 and 108 can be, for example, disk refiners or other types of refiners. Disk refiners have rotating disks with serrated or other contoured surfaces, and one disk will rotate one direction, while the other disk rotates in an opposite direction or remains fixed in place. The rotating disks cuts, frays, and softens the fibers of the wood material that is pumped into the refiners 106 and 108. The space between the disks can be adjusted to change the degree of refining performed by the refiners 106 and 108.

Generally speaking, the type of wood materials (or combinations of wood materials) and the amount of refining affect the qualities of the material output by the system 100. For example, if the fiber length is decreased, the strength of the paper produced generally decreases, but the smoothness generally increases. As the amount of refining is increased (e.g., which corresponds to an increase in power consumption), the density, hardness, ink holdout, smoothness, and internal bond strength will increase, but thickness, compressibility, and dimensional stability will decrease.

In the system depicted by the user interface 100, the refiner 106 processes a single wood material (e.g., pine material), while the refiner 108 processes a combination of wood material (e.g., pine and eucalyptus). As shown, a splitter 110 has an input connected to the pine source 102, and has two outputs that direct pine wood material to each of the refiner 106 and the refiner 108. In FIG. 1, the splitter 110 is configured to direct 60% of the pine wood material received by the splitter 110 to the refiner 106 by way of one of the outputs. The refiner 106 then refines the pine wood material and outputs the refined pine wood material. Meanwhile, the other output of the splitter 110 directs the other 40% of the pine wood material towards the refiner 108.

A merger 112 is connected between the refiner 108 and each of the splitter 110 and the eucalyptus source 104. More specifically, the merger 112 has two inputs, one of which is connected to the splitter 110, and another input that is connected to the eucalyptus source 104. The merger 112 also has an output that is connected to the refiner 108. The merger 112 is configured to combine the pine wood material received from the splitter 110 with eucalyptus wood material that is received from the eucalyptus source 104, and pass the combination of wood material to the refiner 108. In the present example, the merger 112 is configured to output a wood mixture that is 88% pine and 12% eucalyptus. The refiner 108 is configured to receive and process the wood mixture provided by the merger 112, and output the refined wood mixture.

The user interface 100 also includes a quality node 114 ("Quality Node A") that is located between the splitter 110 and the refiner 106 and a quality node 116 ("Quality Node B") that is located at the output of the refiner 106. Each quality node is a software probe that provides a quality measure for the material being processed at that point in the processing pipeline. For example, the quality node 114 provides a quality measure of the material that is between the splitter 110 and the refiner 106, while the quality node 116 provides a quality measure of the material that is output from the refiner 106. The quality measures provided by the quality nodes can be computed based on a statistical modeling of historical quality data of materials at various points along the processing pipeline when manufacturing conditions were similar to, or the same as, the current manufacturing conditions.

In some situations, the graphical elements depicting the quality nodes can reveal quality information in response to user interaction with the graphical elements. For example, a user click, tap, or other interaction with either of the quality node 114 or the quality node 116 can cause presentation of one or more quality measures for the materials at different points along the processing pipeline. As such, the quality nodes enable real time evaluation and presentation of quality measures for materials being processed without having to stop processing the materials, take a sample of the materials, or subject the samples to physical/chemical testing. This real time evaluation of quality measure allows for real time changes to be made to the processing pipeline so as to adjust the qualities of the materials during processing, as discussed in more detail below.

As mentioned above, the quality of paper pulp can be evaluated in a number of ways. For example, the quality of paper pulp can be evaluated based on a set of qualities that can include one or more of the opacity, bulk, TEA, burst, tensile, tear, CSF, and/or longfiber. In some implementations, these qualities of the paper pulp can be presented to a user in a manner similar to the user interface depicted in FIG. 2.

Figure 2:
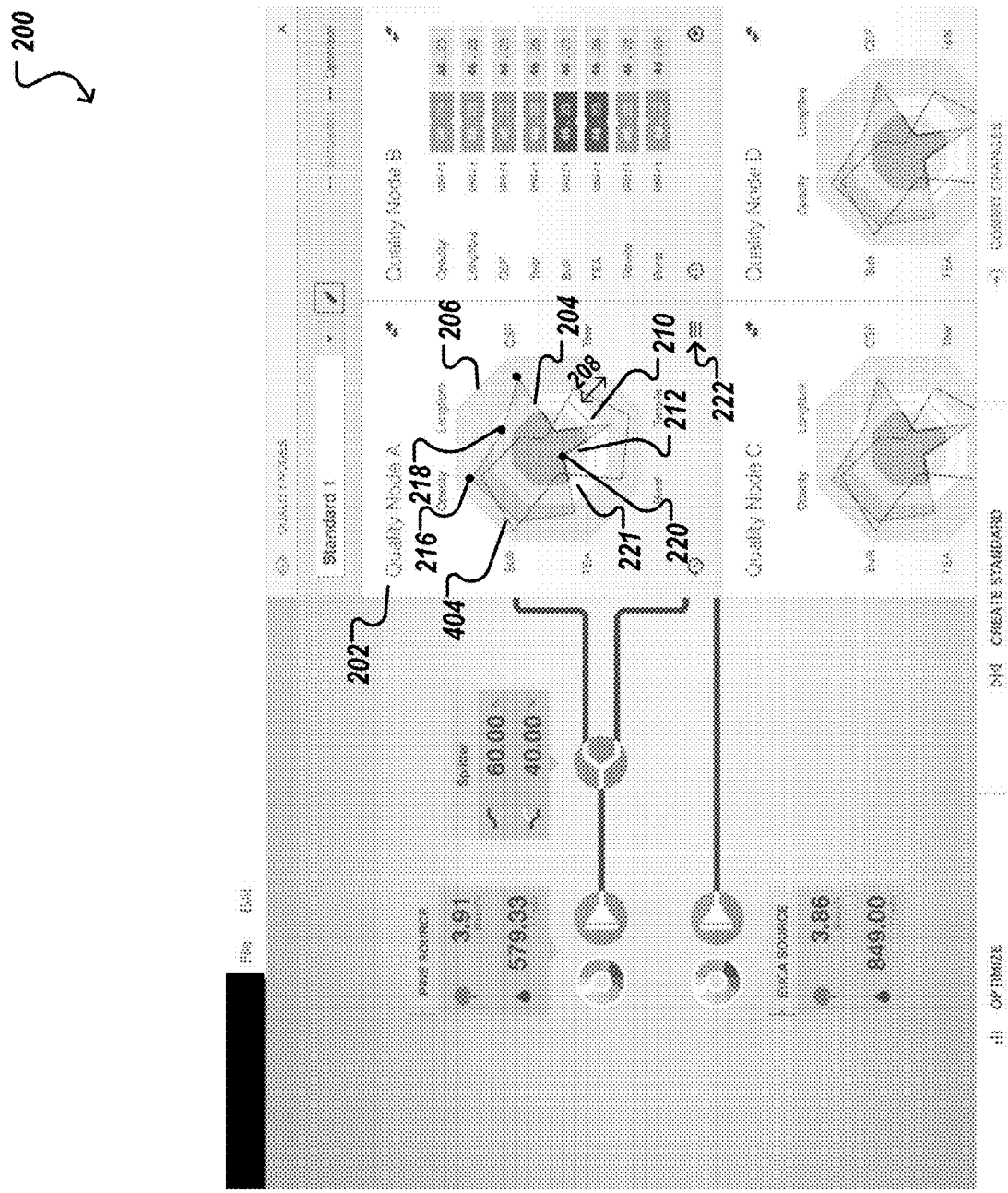
FIG. 2 is an example user interface in which a set of qualities are visually presented.

FIG. 2 is an example user interface 200 in which a set of qualities are visually presented. The user interface 200 visually represents values of the qualities in different ways. For example, the user interface 200 includes a first user interface pane ("pane") 202 that includes a spider graph 204 presented over a quality template 206. The quality template 206 has an octagon shape made up of eight different triangle or pie portions. Each of the vertices of the octagon is assigned to a corresponding quality. For example, each of the opacity, bulk, TEA, burst, tensile, tear, CSF, and/or longfiber qualities is assigned to a corresponding vertex of the quality template 206.

The quality template 206 has multiple different zones that represent different quality levels. For example, the quality template 206 has an over-target zone 208 that corresponds to an over-target level of quality for each of the qualities. An over-target level of quality is a level of quality that exceeds a target quality level (e.g., a discrete target quality level or a target quality range). The quality template 206 also has an at-target zone 210 that corresponds to an at-target level of quality for each of the qualities. An at-target level of quality is a level of quality that meets the target quality level. The quality template also has an under-target zone 212 that corresponds to an under-target level of quality for each of the qualities. An under-target level of quality is a level of quality that does not meet the target quality level.

A spider graph 214 (or another graph) can be generated and presented over the quality template 206. The spider graph 214 visually represents values of the qualities that are assigned to the vertices of the quality template 206. In some implementations, the value of each quality is placed along an axis that connects the center of the octagon with the vertex that is assigned to that quality. For example, the value of opacity is represented by the dot 216, while the values of Longfiber and burst are represented by the dots 218 and 220, respectively. As shown, the value of opacity is located in the over-target zone 208, the value of Longfiber is in the at-target zone 210, and the value of burst is in the under-target zone 212.

The dots corresponding to the different quality measures of the material being processed can be connected by lines, as shown. The area within the lines connecting the dots can then be color coded based on the portion of the quality template 206 that is overlaid by the area. For example, as shown in FIG. 2, portions of the area within the lines that are over the over-target zone 208 can be presented in a first color (or fill/shading), such as green or light grey. Meanwhile, the portions of the area within the lines that are over the at-target zone 210 can be presented in a second color (or fill/shading), such as yellow or another color, and the portions of the area within the lines that are over the under-target zone 212 can be presented in a third color (or fill/shading), such as red or another color that visually differentiates this portion from the other portions.

Color coding the spider graph 214 (or other graph) in this manner enables the user to quickly identify the overall quality of the materials and to quickly identify any qualities that are not meeting a pre-specified or target level. Furthermore, the quality summary depicted by way of the user interface 200 enables the computer to provide an intuitive summary of quality measures for multiple different quality metrics (or qualities) without requiring a user to launch separate quality metric interfaces or tables. As such, users are provided access to a large amount of data in a more efficient manner (e.g., without having to navigate or launch various different user interfaces or applications).

The quality measure values can be normalized or otherwise adjusted so that different value ranges can be uniformly (or consistently) represented/overlaid on the quality template 206. For example, the target value for each quality metric can be set at the dotted line 220 that is within the at-target zone 210, and the value range for each quality metric can be uniformly represented along a corresponding line between the center of the quality template to one of the vertices of the quality template 206. Other ways of normalizing or adjusting the quality measures values to provide at a consistent graphical representation over the quality template 206 can also be used.

Figure 3:
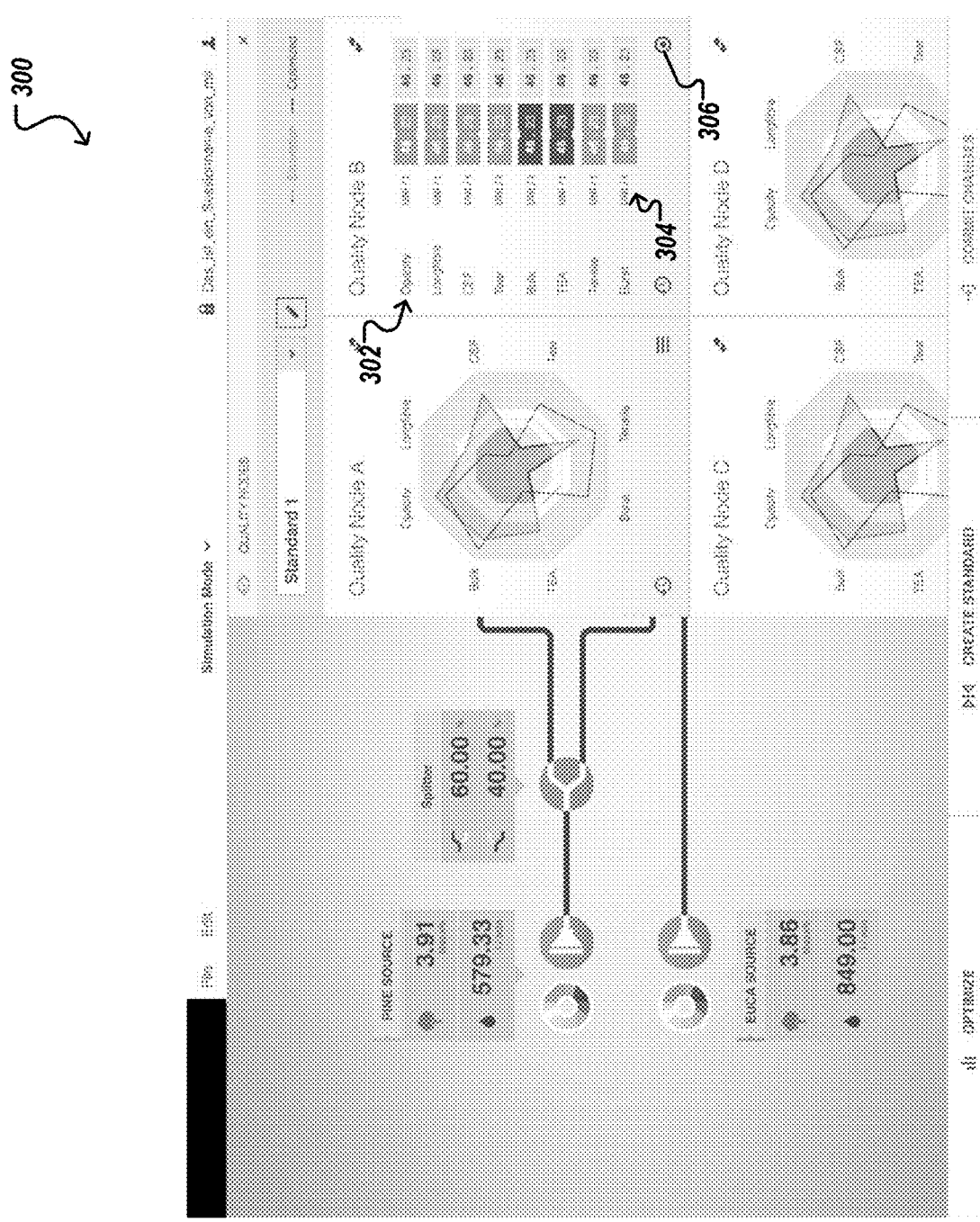
FIG. 3 is an example of another user interface in which a set of qualities are visually presented.

The user interface 200 can include a toggle control 222 that causes the user interface 200 to transition to the user interface 300 of FIG. 3. The user interface 300 presents the quality information from the user interface 200 in a tabular format, which enables the user to quickly see the underlying values for each quality depicted in FIG. 2. For example, the user interface 300 indicates that the opacity 302 has a value of 46.23, and that the burst 304 of the material being processed is 50.50. The tabular information provided by the user interface 300 can also be color coded in a manner similar to the color-coding used in the user interface 200. For example, the value presented for the opacity 302 can be color-coded with green (or some other fill/shading) indicating that the opacity value is within the over-target zone 208 of the quality template, while the value presented for the burst 304 can be color-coded with red (or some other fill/shading) indicating that the burst value of the material is within the under-target zone 212 of the quality template 206. The user interface 300 can also include a toggle control 306 that causes the user interface 200 to again be presented when a user interacts with the toggle control 306.

As discussed in more detail below, the system that generates the user interfaces 200 and 300 can include an optimizer that optimizes a production measure corresponding to the processing of the material. As used throughout this document, the term "optimize" refers to an improvement in a given metric (or measure) over a current or reference metric (or measure), and does not necessarily refer to a single optimal value. The production measure to be optimized can be any aspect of material processing that can be adjusted by making changes to the manufacturing conditions. In some situations, the production measure to be optimized is total cost of manufacturing, while is other situations, the production measure to be optimized could be material waste, power usage, or a specified quality of the material being processed.

The optimization of the production measure is achieved, for example, by adjusting various manufacturing conditions. For example, in paper pulp processing, the mixture of hardwood material and softwood material can be adjusted, which can adjust the cost of producing the paper pulp. In another example, the power used during the processing of paper pulp can be adjusted, for example, by changing refining settings and/or other processes that utilize power during the processing. When manufacturing conditions are changed, the qualities of the material output by the processing will also change. For example, changing the wood mixture being processed will cause changes to various qualities such as burst, long-fiber, and other qualities.

The quality changes that will result from changing (or optimizing) one or more production measures can be determined and/or quantified in a manner similar to the determination of the current qualities of the material currently being processed. For example, the system can utilize a statistical model of historical data to determine the qualities of materials that would be generated under a proposed set of manufacturing conditions (e.g., candidate manufacturing conditions) that will provide the changed or optimized production measures. More specifically, a candidate set of manufacturing conditions that will achieve the optimized production measures can be input into a statistical model generated using historical data, including various different combinations of manufacturing conditions and corresponding qualities of materials produced under those various different combinations of manufacturing conditions. The output of the statistical model will be a set of candidate qualities for the material that will be produced under the candidate set of manufacturing conditions. The set of candidate qualities can be overlaid onto the quality template along with the current qualities of the material currently being processed so as to allow for direct comparison of the two sets of qualities.

Figure 4:
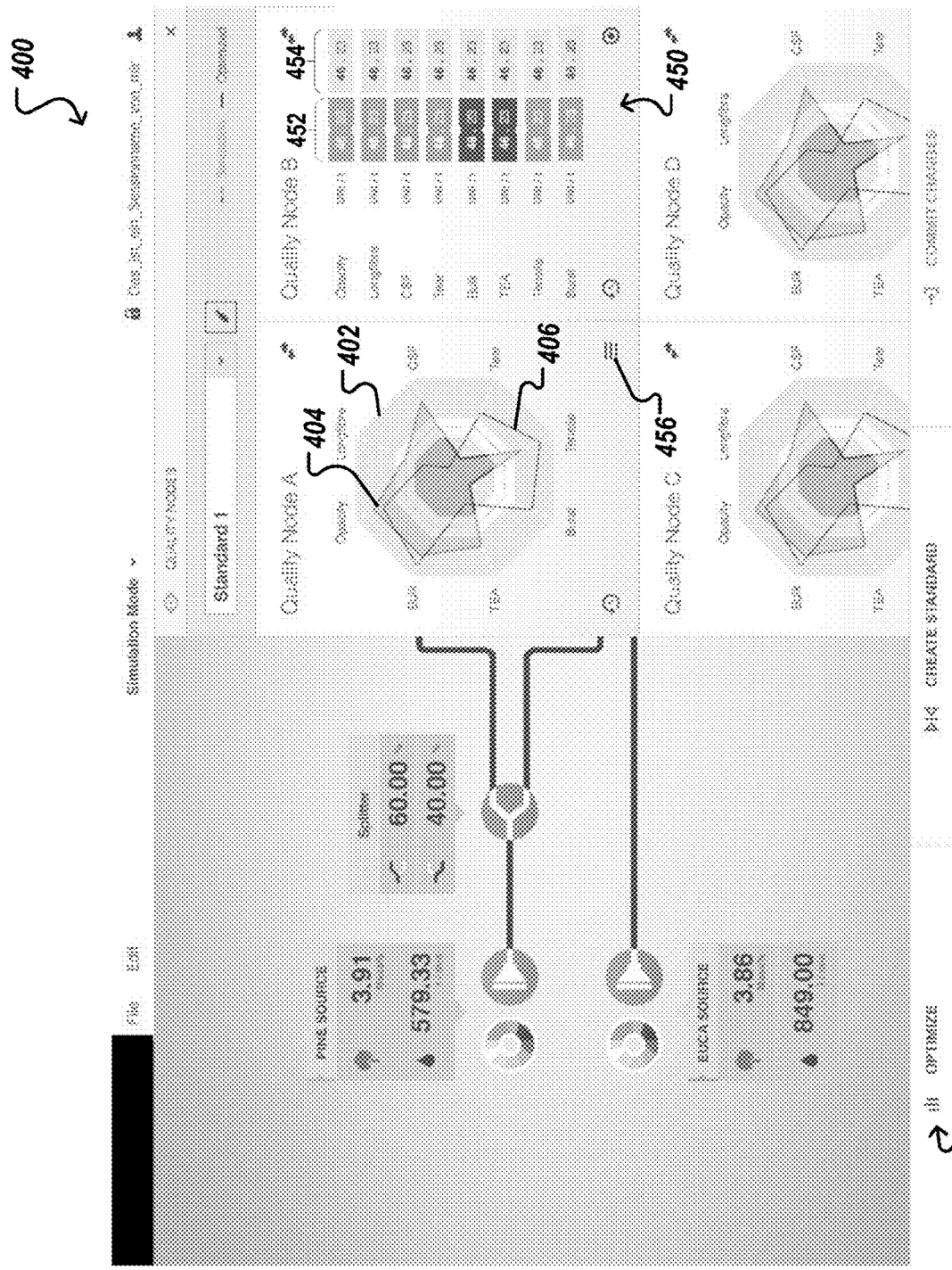
FIG. 4 is an example user interface in which the set of candidate qualities are graphically presented over a quality template.

FIG. 4 is an example user interface 400 in which the set of candidate qualities are graphically presented over a quality template 402. The set of candidate qualities are represented as a spider graph 404, similar to the spider graph 214. The user interface 400 also includes a spider graph 406 that represents the current qualities of the materials currently being processed under the current manufacturing conditions.

Presenting the spider graph 404 and the spider graph 406 together over the same quality template 402 enables direct comparison of the current qualities of the materials currently being processed and the candidate qualities that will result if the manufacturing conditions are changed to achieve the optimized production measure(s). For example, the user interface 400 shows that when the manufacturing conditions are changed to match the candidate set of manufacturing conditions, the long-fiber of the material being produced will fall, but that the burst of that material will increase.

This ability to visualize the changes to the qualities that will result from changing the manufacturing conditions prevents the wasted time and resources (e.g., materials) that would result from trying different combinations of manufacturing conditions, testing the materials produced under each combination of manufacturing materials, and further adjusting the manufacturing conditions until arriving at a set of manufacturing conditions that not only provide an improved production measure relative to a baseline production measure (e.g., current production measure), but also provide materials that have a desired set of qualities. In some implementations, the values of the candidate qualities can be included in a tabular comparison 450 of the current qualities 452 and the candidate qualities 454 that are presented in response to user interaction with a toggle control 456 of the user interface 400.

The user interface 400 can include an optimize control 458 that can initiate a number of actions. In some implementations, user interaction with the optimize control 458 invokes the determination of the candidate set of manufacturing conditions and/or the set of candidate qualities of materials that will be produced under the candidate set of manufacturing conditions. In some implementations, interaction with the optimize control 458 (or another user interface element) can cause the system to change a physical setting of at least one piece of manufacturing equipment to achieve the candidate set of manufacturing conditions. For example, the change in physical settings could be a change to a speed of a refiner, a physical position of a valve (e.g., in a splitter, merger, or source), or another physical setting (or position) of another piece of manufacturing equipment so as to change the manufacturing conditions.

Figure 5:
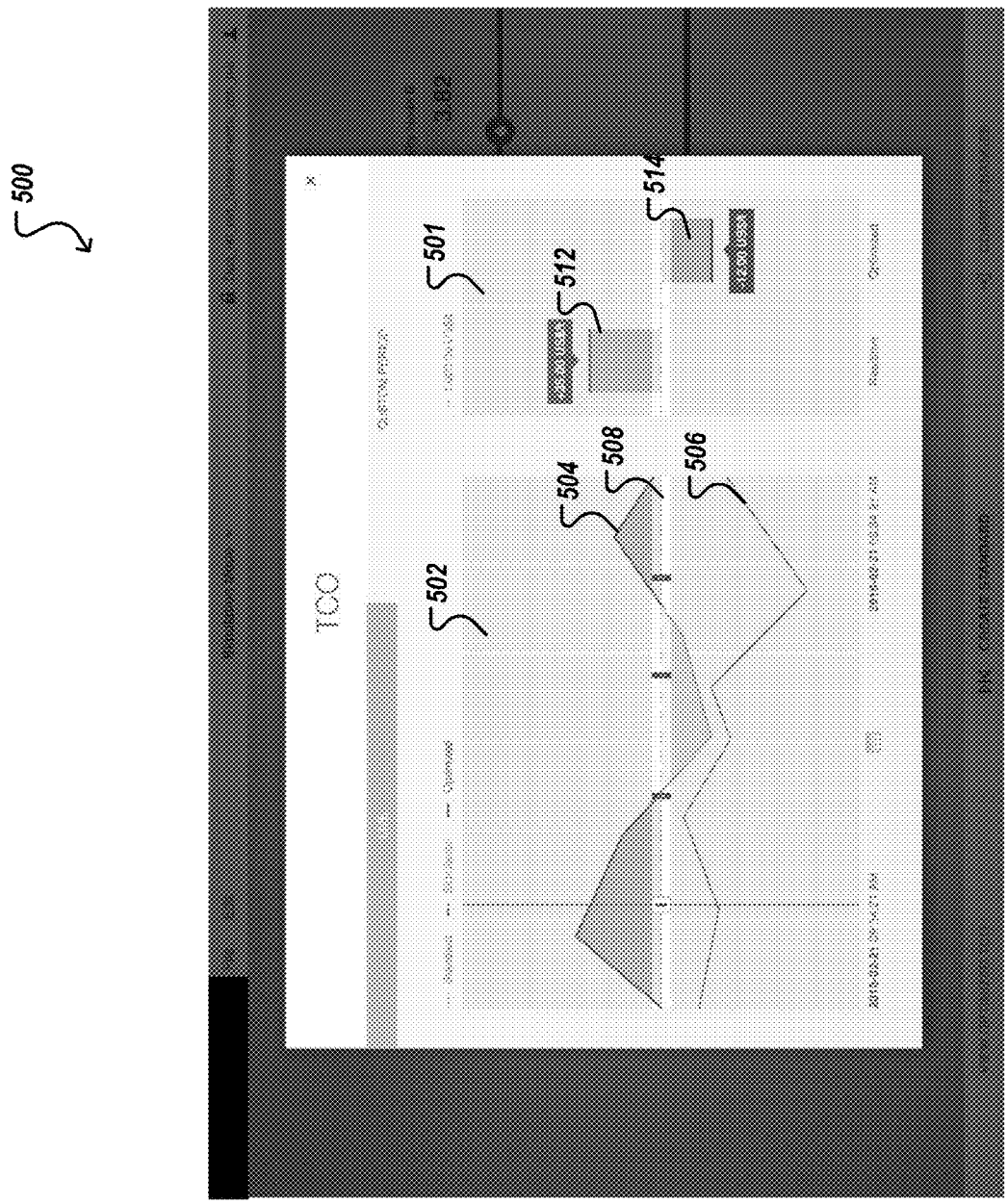
FIG. 5 is an example user interface includes a history chart that presents changes to a production measure over time.

Changes caused by changing manufacturing conditions can be tracked and/or displayed over time. FIG. 5 is an example user interface 500 includes a history chart 502 that presents changes to a production measure over time. The history chart 502 includes a line graph 504 that represents the measured value of the production measure over time. The history chart 502 also includes another line graph 506 that represents an optimized value of the production measure that would have resulted over time if the candidate set of manufacturing conditions had been used. Presenting both of the line graph 504 and the line graph 506 together in the history chart 502 enables direct comparison of the measured value over time to the optimized value over time. Note that other types of graphs could also be presented.

In some implementations, the line graph 504 can be color-coded based on the value of the line graph relative to a baseline production measure (e.g., represented by the dotted line 508). The baseline production measure 508 can be a pre-specified production measure, such as a target production measure, an average production measure over time, or some other value of the production measure that can be used as a reference point for evaluating changes to the production measure over time. The system can apply the color-coding, for example, by applying negative color (e.g., red) to portions of the line graph 504 representing values of the line graph 504 that are less desirable than the baseline production measure 508. Additionally, the area under the curve for these less desirable portions of the graph 504 can also be color-coded using the negative color. The system can apply a positive color (e.g., green) to portions of the line graph 504 representing values of the line graph 504 that are more desirable than the baseline production measure 508. Additionally, the area under the curve for these more desired portions of the graph 504 can also be color-coded using the positive color.

In a specific example, the production measure can be a total cost of manufacturing, and the line graph 504 can represent the cost of manufacturing over a specified time period. Meanwhile, the line graph 506 can represent the cost of manufacturing if the optimizations has been implemented over that specified time period. In this example, portions of the line graph 504 having values that are higher than the baseline cost 508 are the less desirable portions of the line graph 504, while portions of the graph having values that are lower than the baseline cost 508 are the more desirable portions of the line graph 504. As such, the portions of the line graph 504 can be color-coded according to the description above.

The user interface 500 also includes an aggregate production measure chart 510 that presents a bar graph 512 (or another type of graph) depicting an aggregate value of the production measure over the specified time period. In some implementations, the bar graph 512 has a value corresponding to the difference between the aggregate baseline production measure over the specified period relative to the aggregate value of the measured production measure over the specified time period. For example, the bar graph 512 shows that the total cost of manufacturing over the specified period was $35 higher than the baseline cost over that specified time period.

The aggregate production measure chart 510 also presents another bar graph 514 depicting an aggregate value of the production measure that would have been realized over the specified time period had the optimizations been implemented. In some implementations, the bar graph 514 has a value corresponding to the difference between the aggregate baseline production measure over the specified period relative to the aggregate value of the production measure that would have been realized over the specified time period if the optimizations had been implemented. For example, the bar graph 514 shows that the total cost of manufacturing over the specified period would have been $12 lower than the baseline cost over that specified time period if the optimizations had been implemented.

Figure 6:
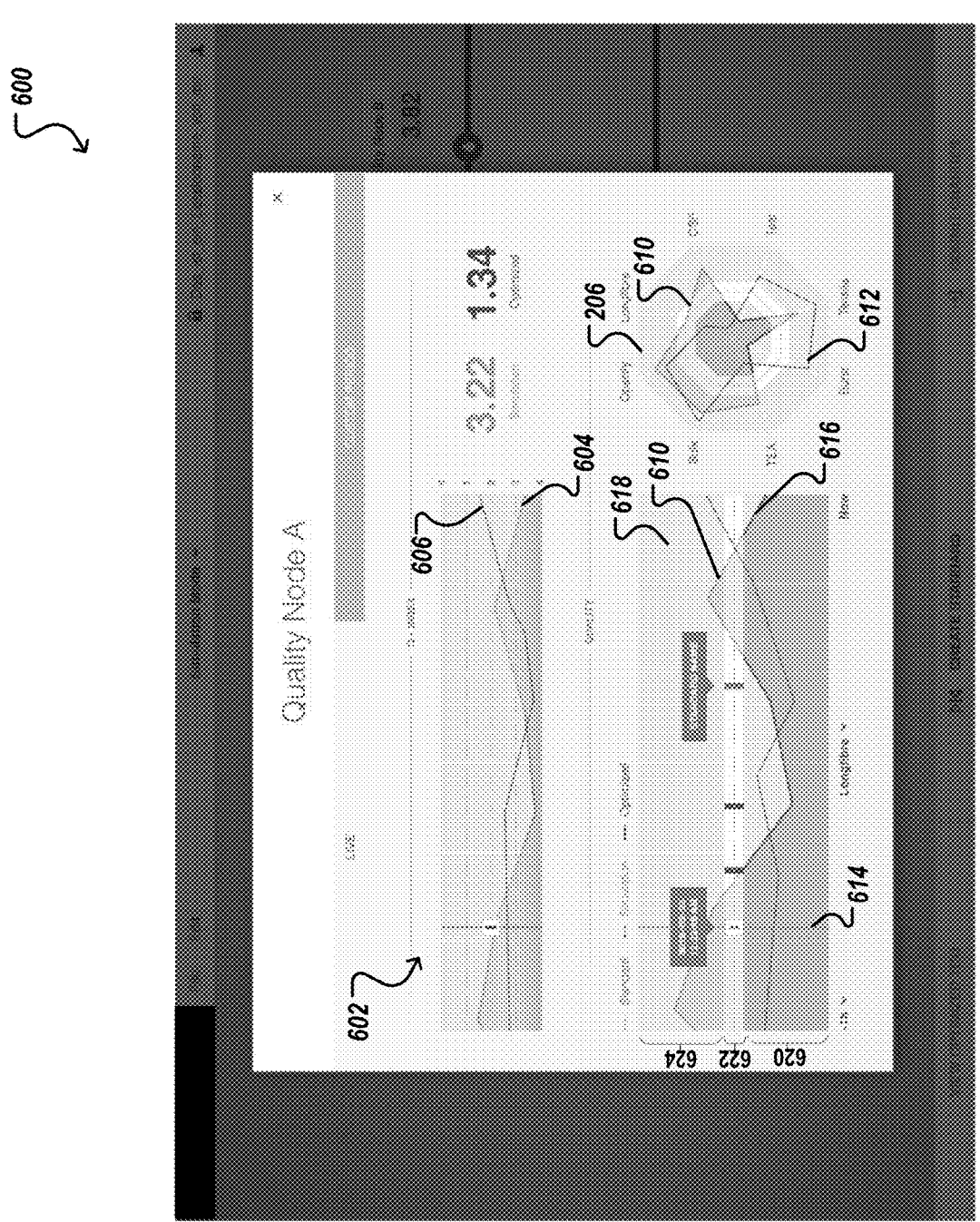
FIG. 6 is an example user interface that presents one or more qualities for materials produced over a specified time period.

FIG. 6 is an example user interface 600 that presents one or more qualities for materials produced over a specified time period. The user interface 600 includes an aggregate quality zone 602 that presents aggregate quality measures over the specified time period (e.g., in the form of a line graph). The aggregate quality measures can be generated based on a combination of the individual quality measures presented, for example, in FIG. 2. In some situations, the aggregate quality measure conveys an overall quality of the materials produced.

For example, a set of target qualities for the materials produced can be input or set by the manufacturer (or client), and the aggregate quality measure for those materials can be a value indicating how well the materials actually produced meet the set of target qualities. In some situations, the contribution of each quality measure to the aggregate quality measure can be weighted, for example, based on an importance of that quality to the manufacturer. Furthermore, the aggregate quality measure can be normalized to a standardized scale (e.g., 0-4) and plotted in the aggregate quality zone 602.

The aggregate quality zone 602 can present a line graph 604 that visually represents the aggregate quality of the materials produced over time. In some situations, the line graph 604 (and/or areas under the line/curve) can be color-coded according to the value of the aggregate quality over time in a manner similar to that described above with reference to the color-coding of production measure graphs. For example, lower levels of aggregate quality can have a different color (or shade) than higher levels of aggregate quality.

The aggregate quality zone 602 can also present a line graph 606 that represents the aggregate quality of materials that would have been generated if the optimizations had been implemented over the specified time period. Presenting the line graph 606 together with the line graph 604 enables direct comparison of the actual quality over time with the quality that could have been realized using the optimizations. In other words, the collected quality data is used to create new data showing an aggregate quality, and new data showing the aggregate quality that would have been realized under the optimizations are presented together for purposes of evaluating the actual materials produced relative to what would have been produced if the manufacturing conditions had been adjusted according to the optimizations.

The user interface 600 also includes a per-quality zone 608 that presents information about individual qualities over time. For example, the per-quality zone 608 presents the quality template 206 discussed with reference to FIG. 2, which is overlaid with a spider graph 610 similar to the spider graph 214 discussed above with reference to FIG. 2. The quality template 206 is also overlaid with an optimized spider graph 612 similar to the spider graph 404 of FIG. 4. More specifically, the spider graph 610 shows quality measures of materials produced, while the spider graph 612 shows the quality measures of materials that would have been produced if the optimizations (e.g., candidate set of manufacturing conditions) had been implemented. The spider graphs 610 and 612 can be dynamically updated as a user moves a cursor 614 along a timeline of a line graph 616 to show the qualities of materials being produced at the time corresponding to the position of the cursor as well as the qualities of materials that would have been produced at that time if the optimizations had been implemented.

The line graph 616 represents the values of a particular quality (Longfiber in this example) of the materials produced over a specified time period. The line graph 616 can be overlaid on a time-based quality template 618 that includes an under-target zone 620, an at-target zone 622 and an over-target zone 624. These zones generally correspond to the similarly named zones of the quality template 206, but in a time-series chart. Further, the line graph 616 can be color-coded based on the time-based quality template 618 in a manner similar to that discussed with respect to the quality template 206. For example, areas under the line graph 616 can be shaded (or colored) according to the portion of the quality template 618 that is under those areas of the line graph.

Figure 7:
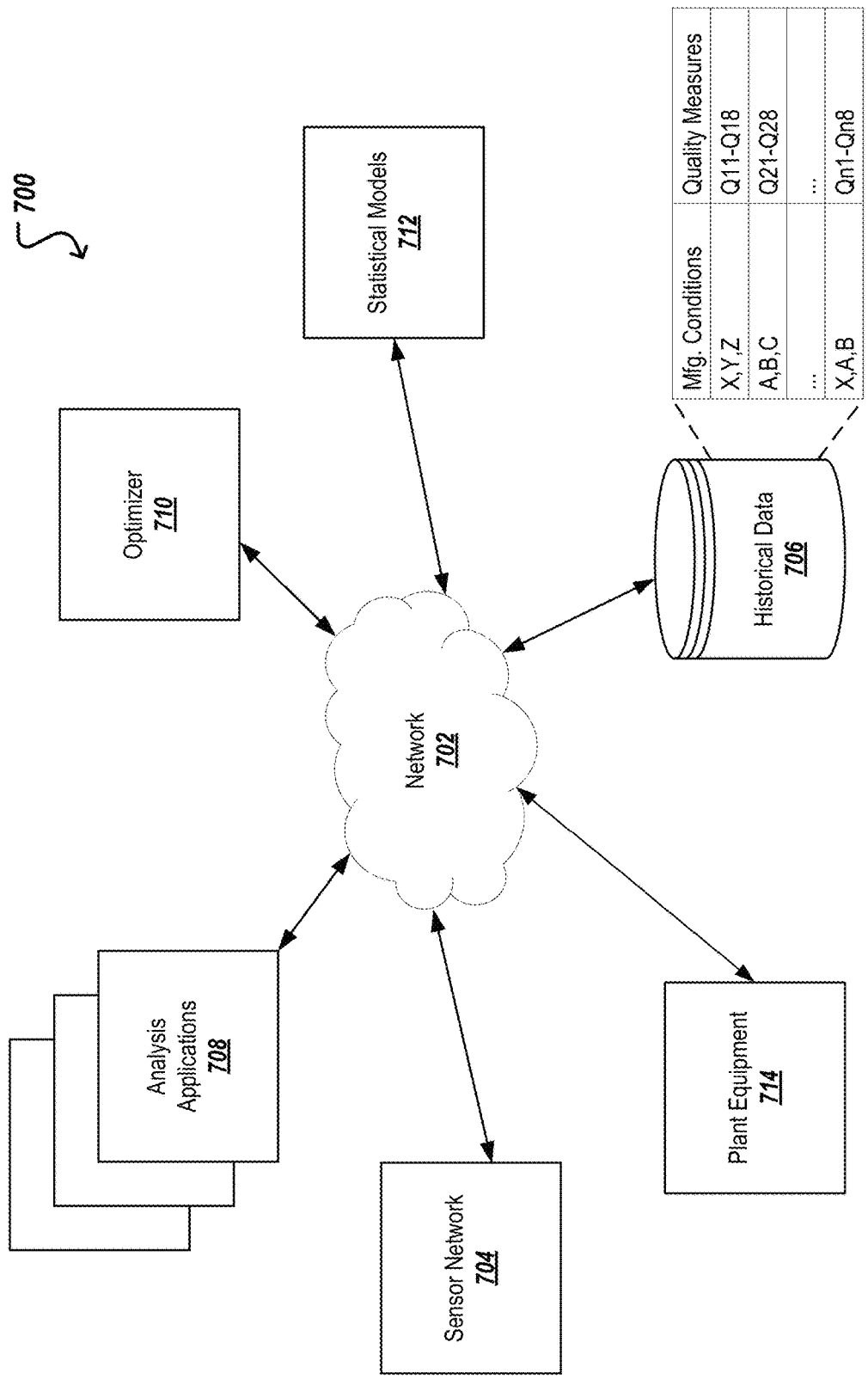
FIG. 7 is a block diagram of an example environment in which optimizations can be determined and/or implemented.

FIG. 7 is a block diagram of an example environment 700 in which optimizations can be determined and/or implemented. The environment 700 includes a network 702, such as a local area network (LAN), a wide area network (WAN), the Internet, or a combination thereof. The network 702 connects a sensor network 704, a historical database 706, analysis applications 708, an optimizer 710, statistical models 712, and manufacturing equipment 714.

The sensor network 704 can include various sensors that are distributed throughout a manufacturing plant. For example, the sensor network 704 can include vibration sensors, valve monitors, temperature probes, pressure gauges, flow meters, and/or other sensors that can monitor manufacturing conditions of the manufacturing plant. The sensor network stores the collected data in the historical database 706. The data stored in the historical database 706 can include, for example, sets of manufacturing conditions 716 and quality measures 718 of materials produced under the corresponding sets of manufacturing conditions. For example, for a given set of manufacturing conditions X, Y, Z, the historical database 706 can store quality measures $Q_{11}$-$Q_{18}$ of the materials that were produced under those manufacturing conditions.

The manufacturing conditions and quality measures can be stored over time, and used by one or more data processing apparatus to create the statistical models 712. The statistical models 712 can be generated (and hosted) by model servers using the historical data 706. In some situations, the statistical models can be generated using various statistical techniques and/or modeling techniques. For example, the models can be generated using linear or logistic regression.

In some situations, the data used to generate the statistical models 712 can include additional data generated by the analysis applications 708. For example, the analysis applications 708 can use the data collected by the sensor network 704 to make determinations (or inferences) and generate new data that characterize the manufacturing conditions that exist and/or the quality of the materials being produced. The determinations made by the analysis applications 708 can similarly be stored in the historical data 706 and used in the generation of the statistical models 712.

The optimizer 710 is one or more data processing apparatus (e.g., hardware processors) that can optimize the operation of a manufacturing facility using the statistical models 712, data from the sensor network 704, and/or data from the analysis applications 708. In some implementations, the optimizer 710 can be configured to carry out any or all of the operations and techniques discussed in this document. For example, the optimizer can determine current qualities of materials being produced based on the manufacturing conditions that currently exist, identify a candidate set of manufacturing conditions that will provide an improved production measure relative to a baseline production measure, generate visualizations that represent qualities of materials currently being produced as well as qualities of materials that would be produced using the candidate set of manufacturing conditions, and present the visualizations in user interfaces similar to those discussed above.

Furthermore, the optimizer 710 can cause physical changes to the operation of the manufacturing facility. For example, the optimizer 710 can communicate with the manufacturing equipment 714 to change a physical position of a valve, physically adjust a damper setting, change an amount of material flowing through a portion of the processing pipeline, or otherwise change the physical state of the plant equipment.

Figure 8:
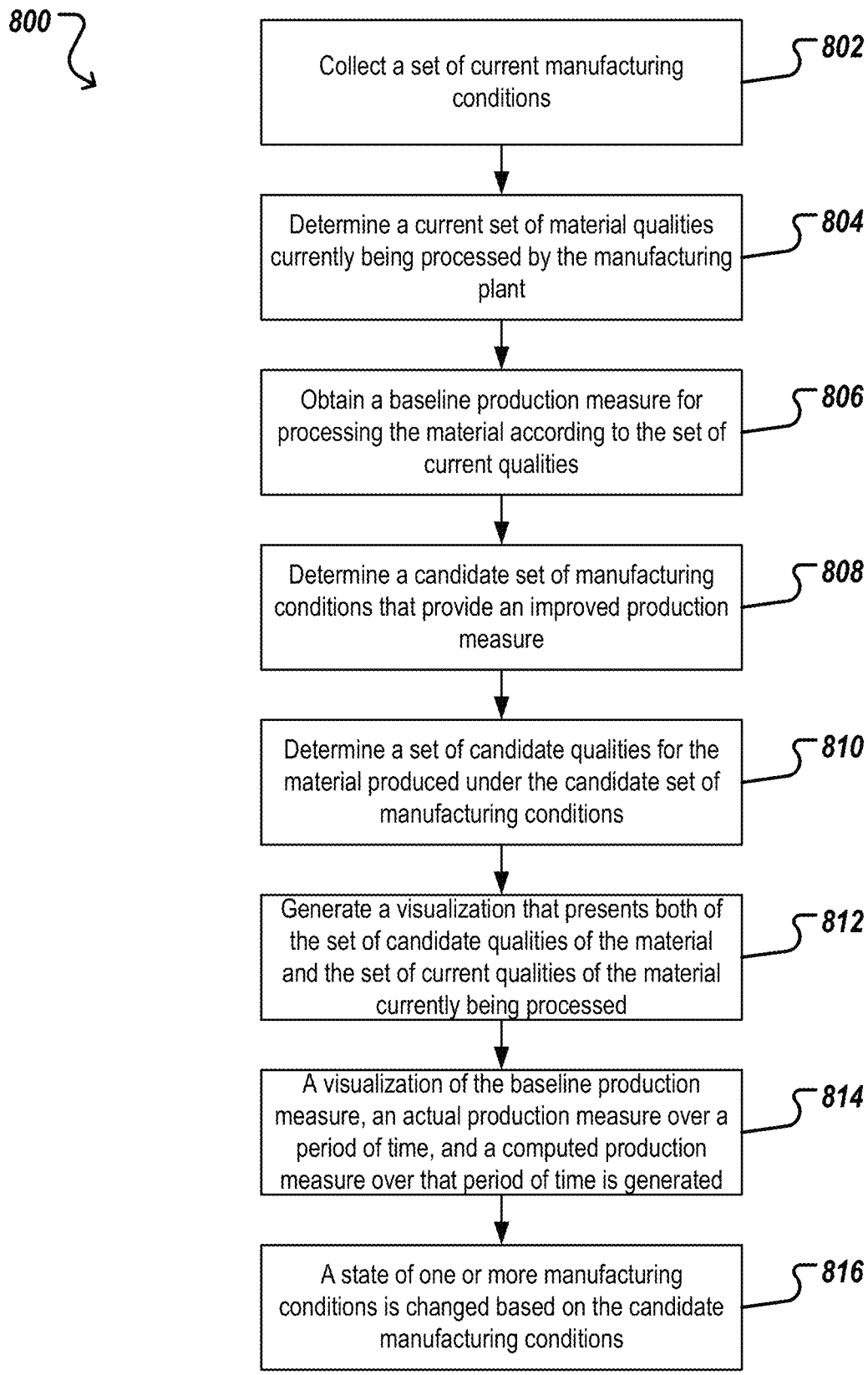
FIG. 8 is a flow chart of an example process of optimizing operation of a manufacturing plant.

FIG. 8 is a flow chart of an example process 800 of optimizing operation of a manufacturing plant. Operations of the process 800 can be implemented, for example, by the optimizer 710 and/or one or more data processing apparatus. In some implementations, operation of the process 800 can be implemented as instructions stored on a non-transitory computer readable medium, where execution of the instructions by one or more data processing apparatus cause the one or more data processing apparatus to perform operations of the process 800.

A set of current manufacturing conditions are collected from a set of sensors (802). The sensors can be a set of sensors distributed throughout a manufacturing facility (e.g., a materials processing facility, such as a paper pulp plant). For example, the sensors can include pressure sensors, temperature sensors, flow meters, vibration sensors, or other sensors that collect data about the operation of a manufacturing facility. The set of manufacturing conditions can include, for example, characteristics of the source materials being processed (e.g., composition), flow rates, temperatures, equipment settings, environmental settings, equipment status (e.g., normal operation or abnormal operation states), or other characteristics of the environment in which materials are being processed.

A set of current qualities of materials currently being processed by manufacturing equipment are determined (804). The current qualities of the materials currently being processed can be determined, for example, by inputting the set of current manufacturing conditions into a statistical model that outputs the set of current qualities of materials that are generated under the current manufacturing conditions. As discussed above, the statistical models can be generated based on an analysis of qualities of materials processed under various different combinations of manufacturing conditions. Determining the current qualities in this manner is performed without having to take the manufacturing equipment offline, and without having to await test results, which is not possible if the actual materials being produced were required to be physically tested.

A baseline production measure is obtained for processing the material according to the set of current qualities (806). In some implementations, the baseline production measure can be a pre-specified production measure, such as a target production measure, an average production measure over time, or some other value of the production measure that can be used as a reference point for evaluating changes to the production measure over time. The baseline production measure can be specified by a user of the system or determined based on historical data. The baseline production measure can be any aspect of material processing that can be adjusted by making changes to the manufacturing conditions. In some situations, the baseline production measure can be any one of a total cost of manufacturing, waste, power usage, or a specified quality of the material being processed.

A candidate set of manufacturing conditions that provide an improved production measure relative to the baseline production measure is determined (808). In some implementations, the candidate set of manufacturing conditions includes one or more changes in physical settings of manufacturing equipment, such as a change to a speed of a refiner, a physical position of a valve (e.g., in a splitter, merger, or source), a change to the composition of source material (e.g., changing ratios of hardwood/softwood), or another change to another setting of another piece of manufacturing equipment so as to change the manufacturing conditions. The candidate set of manufacturing conditions can be determined, for example, using historical plant data and/or a statistical model. For example, the current set of manufacturing conditions and the current production measure can be input into a statistical model that represents relationships between manufacturing conditions and the production measure. In this example, the output of the statistical model can be the set of manufacturing conditions that will improve the production measure.

In some implementations, the candidate set of manufacturing conditions can be determined by determining a one or more of a wood source mixture or power consumption that provide a candidate improved production measure. More specifically, a statistical model generated based on materials previously produced with various combinations of manufacturing conditions can be used to determine those manufacturing conditions that will improve the performance measure while generating materials having a corresponding set of qualities. In other words, the determination of the candidate set of manufacturing conditions can ensure that materials processed with the one or more of the wood source mixture or the power consumption will provide the improved production measure, and ensure that the materials produced will have a corresponding set of qualities (e.g., as specified by the user).

A set of candidate qualities for the material produced under the candidate set of manufacturing conditions is determined (810). In some implementations, the set of candidate qualities are the qualities of the material that will be produced when the candidate set of manufacturing conditions are used. For example, the set of candidate qualities can include the qualities discussed with reference to the spider graph 406 of FIG. 4.

In some implementations, the determination of the set of candidate qualities includes an evaluation of multiple different sets of corresponding qualities that would result from using various different combinations of manufacturing conditions. For example, assume that the user has specified a set of target qualities (e.g., desired qualities) for materials output by the manufacturing facility. In this example, multiple different combinations of manufacturing conditions may result in an improved production measure, but not all of these combinations of manufacturing conditions may generate materials having the set of target qualities. As such, the process 800 can include a comparison of the corresponding set of qualities for each combination of manufacturing conditions to target qualities of completed materials.

When it is determined that the corresponding set of qualities for a particular combination of manufacturing conditions meets the target qualities that corresponding set of qualities can be selected as the candidate set of qualities and the corresponding combination of manufacturing conditions can be the candidate set of manufacturing conditions for the optimization. In some situations, the determination that the corresponding set of qualities meets the target qualities includes a determination that one or more qualities among the corresponding set of qualities is within a custom quality value range specified by a user. Furthermore, if more than one set of qualities meets the target qualities, the corresponding set of qualities having the best aggregate quality measure can be selected.

A visualization that presents both of the set of candidate qualities of the material and the set of current qualities of the material currently being processed is generated (812). In some implementations, the generation of the visualization can include generation of one or more user interfaces similar to those discussed above. In some situations, the visualization is generated to include a first spider graph that represents multiple values of multiple different material qualities. The visualization can also be generated to include a second spider graph that represents different values of the multiple different material qualities. In these situations, both both of the first spider graph and the second spider graph can be incorporated into a target quality template, as shown in FIGS. 3 and 4. The target quality template depicts different zones including, for each target quality, at least a meets target quality zone and a doesn't meet target quality zone. As discussed above with reference to FIG. 2, the first spider graph can be color coded on a per-zone basis.

A visualization of the baseline production measure, an actual production measure over a period of time, and a computed production measure over that period of time is generated (814). In some implementations, the actual production measure represents the production measure for actual materials being produced, while the computed production measure provides the production measure for production of materials that would occur under the candidate manufacturing conditions. This visualization can be generated to include the features of the user interface 500 discussed above with reference to FIG. 5.

A state of one or more manufacturing conditions is changed based on the candidate manufacturing conditions (816). In some implementations, the state of one or more paper pulp processing machines is changed based on the candidate manufacturing conditions. For example, as discussed above, a physical state of a valve, a refiner, or any other paper pulp processing equipment can be changed to match one of the manufacturing conditions specified by the candidate manufacturing conditions.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of optimizing material production, comprising:
    collecting, from a set of sensors, a set of current manufacturing conditions for manufacturing equipment; and
    at one or more points of a plurality of points along a processing pipeline for a material being processed by the manufacturing equipment and during the processing pipeline for the material, performing operations comprising:
        determining, during the processing of the material by the manufacturing equipment and using a model that takes the set of current manufacturing conditions as input, a set of current qualities of the material at the point along the processing pipeline;
        obtaining a baseline production measure for processing the material at the point along the processing pipeline according to the determined set of current qualities of the material;
        determining a candidate set of manufacturing conditions for the manufacturing equipment that provide an improved production measure relative to the baseline production measure for the material at the point along the processing pipeline;
        determining, using the model, a set of candidate qualities for the material produced by the processing pipeline of the manufacturing equipment corresponding to the candidate set of manufacturing conditions;
        in response to determining that the set of candidate qualities meets target qualities for materials produced by the processing pipeline, applying a physical adjustment to the manufacturing equipment at the point along the processing pipeline based on the candidate set of manufacturing conditions; and
        generating and presenting a visualization that presents both of the set of candidate qualities of the material and the set of current qualities of the material currently being processed.

2. The method of claim 1, wherein the model is a statistical model and wherein determining a candidate set of manufacturing conditions for the manufacturing equipment that provide an improved production measure for the material at the point of the processing pipeline relative to the baseline production measure comprises:
    determining a one or more of a wood source mixture or power consumption that provide a candidate improved production measure; and
    determining, based on the statistical model, a corresponding set of qualities of materials processed with the one or more of the wood source mixture or the power consumption.

3. The method of claim 2, wherein determining a set of candidate qualities for the material produced by the processing pipeline of the manufacturing equipment under the candidate set of manufacturing conditions comprises:
    comparing the corresponding set of qualities to the target qualities of completed materials;
    determining that the corresponding set of qualities meets the target qualities; and
    selecting the corresponding set of qualities as the candidate set of qualities based on the determination that the corresponding set of qualities meets the target qualities.

4. The method of claim 3, wherein determining that the corresponding set of qualities meets the target qualities comprises determining that one or more qualities among the corresponding set of qualities is within a custom quality value range specified by a user.

5. The method of claim 1, wherein generating a visualization that presents both of the set of candidate qualities of the material to the set of current qualities of the material currently being processed comprises:
    generating a first spider graph that visually represents a first plurality of values of a plurality of different material qualities;
    generating a second spider graph that visually represents a second plurality of values of the plurality of different material qualities; and
    incorporating both of the first spider graph and the second spider graph into a target quality template that depicts different zones including, for each target quality, at least a meets target quality zone and a doesn't meet target quality zone.

6. The method of claim 5, wherein the first spider graph is color coded on a per-zone basis.

7. The method of claim 1, further comprising generating a visualization of the baseline production measure, an actual production measure over a period of time, and a computed production measure over that period of time, wherein the computed production measure provides the production measure for production of materials under the candidate set of manufacturing conditions.

8. The method of claim 1, further comprising changing a state of one or more paper pulp processing machines based on the candidate set of manufacturing conditions.

9. A system, comprising:
    a data storage device storing executable instructions; and
    one or more data processing apparatus configured to interact with the data storage device and execute the instructions, wherein execution of the instructions cause the one or more data processing apparatus to perform operations including:
        collecting, from a set of sensors, a set of current manufacturing conditions for manufacturing equipment; and
        at one or more points of a plurality of points along a processing pipeline for a material being processed by the manufacturing equipment and during the processing pipeline for the material, performing operations comprising:

determining, during the processing of the material by the manufacturing equipment and using a model that takes the set of current manufacturing conditions as input, a set of current qualities of the material at the point along the processing pipeline;

obtaining a baseline production measure for processing the material at the point along the processing pipeline according to the determined set of current qualities of the material;

determining a candidate set of manufacturing conditions for the manufacturing equipment that provide an improved production measure relative to the baseline production measure for the material at the point along the processing pipeline;

determining, using the model, a set of candidate qualities for the material produced by the processing pipeline of the manufacturing equipment corresponding to the candidate set of manufacturing conditions;

in response to determining that the set of candidate qualities meets target qualities for materials produced by the processing pipeline, applying a physical adjustment to the manufacturing equipment at the point along the processing pipeline based on the candidate set of manufacturing conditions; and generating and presenting a visualization that presents both of the set of candidate qualities of the material and the set of current qualities of the material currently being processed.

10. The system of claim 9, wherein the model is a statistical model and wherein determining a candidate set of manufacturing conditions for the manufacturing equipment that provide an improved production measure for the material at the point of the processing pipeline relative to the baseline production measure comprises:

determining a one or more of a wood source mixture or power consumption that provide a candidate improved production measure; and determining, based on the statistical model, a corresponding set of qualities of materials processed with the one or more of the wood source mixture or the power consumption.

11. The system of claim 10, wherein determining a set of candidate qualities for the material produced by the processing pipeline of the manufacturing equipment under the candidate set of manufacturing conditions comprises:

comparing the corresponding set of qualities to the target qualities of completed materials;

determining that the corresponding set of qualities meets the target qualities; and selecting the corresponding set of qualities as the candidate set of qualities based on the determination that the corresponding set of qualities meets the target qualities.

12. The system of claim 11, wherein determining that the corresponding set of qualities meets the target qualities comprises determining that one or more qualities among the corresponding set of qualities is within a custom quality value range specified by a user.

13. The system of claim 9, wherein generating a visualization that presents both of the set of candidate qualities of the material to the set of current qualities of the material currently being processed comprises:

generating a first spider graph that visually represents a first plurality of values of a plurality of different material qualities;

generating a second spider graph that visually represents a second plurality of values of the plurality of different material qualities; and incorporating both of the first spider graph and the second spider graph into a target quality template that depicts different zones including, for each target quality, at least a meets target quality zone and a doesn't meet target quality zone.

14. The system of claim 13, wherein the first spider graph is color coded on a per-zone basis.

15. The system of claim 9, wherein execution of the instructions causes the one or more data processing apparatus to perform operations including generating a visualization of the baseline production measure, an actual production measure over a period of time, and a computed production measure over that period of time, wherein the computed production measure provides the production measure for production of materials under the candidate set of manufacturing conditions.

16. The system of claim 9, wherein execution of the instructions causes the one or more data processing apparatus to perform operations including changing a state of one or more paper pulp processing machines based on the candidate set of manufacturing conditions.

17. A non-transitory computer storage medium encoded with a computer program, the program comprising instructions that when executed by one or more data processing apparatus cause the one or more data processing apparatus to perform operations comprising:

collecting, from a set of sensors, a set of current manufacturing conditions for manufacturing equipment; and at one or more points of a plurality of points along a processing pipeline for a material being processed by the manufacturing equipment and during the processing pipeline for the material, performing operations comprising:

determining, during the processing of the material by the manufacturing equipment and using a model that takes the set of current manufacturing conditions as input, a set of current qualities of the material at the point along the processing pipeline;

obtaining a baseline production measure for processing the material at the point along the processing pipeline according to the determined set of current qualities of the material;

determining a candidate set of manufacturing conditions for the manufacturing equipment that provide an improved production measure relative to the baseline production measure for the material at the point along the processing pipeline;

determining, using the model, a set of candidate qualities for the material produced by the processing pipeline of the manufacturing equipment corresponding to the candidate set of manufacturing conditions;

in response to determining that the set of candidate qualities meets target qualities for materials produced by the processing pipeline, applying a physical adjustment to the manufacturing equipment at the point along the processing pipeline based on the candidate set of manufacturing conditions; and generating and presenting a visualization that presents both of the set of candidate qualities of the material and the set of current qualities of the material currently being processed.

18. The non-transitory computer storage medium of claim 17, wherein the model is a statistical model and wherein determining a candidate set of manufacturing conditions for the manufacturing equipment that provide an improved production measure for the material at the point of the processing pipeline relative to the baseline production measure comprises:
   determining a one or more of a wood source mixture or power consumption that provide a candidate improved production measure; and
   determining, based on the statistical model, a corresponding set of qualities of materials processed with the one or more of the wood source mixture or the power consumption.

19. The non-transitory computer storage medium of claim 18, wherein determining a set of candidate qualities for the material produced by the processing pipeline of the manufacturing equipment under the candidate set of manufacturing conditions comprises:
   comparing the corresponding set of qualities to the target qualities of completed materials;
   determining that the corresponding set of qualities meets the target qualities; and
   selecting the corresponding set of qualities as the candidate set of qualities based on the determination that the corresponding set of qualities meets the target qualities.

20. The non-transitory computer storage medium of claim 19, wherein determining that the corresponding set of qualities meets the target qualities comprises determining that one or more qualities among the corresponding set of qualities is within a custom quality value range specified by a user.

21. The non-transitory computer storage medium of claim 17, wherein generating a visualization that presents both of the set of candidate qualities of the material to the set of current qualities of the material currently being processed comprises:
   generating a first spider graph that visually represents a first plurality of values of a plurality of different material qualities;
   generating a second spider graph that visually represents a second plurality of values of the plurality of different material qualities; and
   incorporating both of the first spider graph and the second spider graph into a target quality template that depicts different zones including, for each target quality, at least a meets target quality zone and a doesn't meet target quality zone.

22. The non-transitory computer storage medium of claim 21, wherein the first spider graph is color coded on a per-zone basis.

23. The non-transitory computer storage medium of claim 17, wherein execution of the instructions causes the one or more data processing apparatus to perform operations including generating a visualization of the baseline production measure, an actual production measure over a period of time, and a computed production measure over that period of time, wherein the computed production measure provides the production measure for production of materials under the candidate set of manufacturing conditions.

24. The non-transitory computer storage medium of claim 17, wherein execution of the instructions causes the one or more data processing apparatus to perform operations including changing a state of one or more paper pulp processing machines based on the candidate set of manufacturing conditions.

* * * * *